(12) United States Patent
Adachi et al.

(10) Patent No.: US 11,398,342 B2
(45) Date of Patent: Jul. 26, 2022

(54) ELECTRONIC COMPONENT AND MANUFACTURING METHOD FOR THE SAME

(71) Applicant: Murata Manufacturing Co., Ltd., Nagaokakyo (JP)

(72) Inventors: Jun Adachi, Nagaokakyo (JP);
Naganori Hirakawa, Nagaokakyo (JP);
Hiroyuki Asano, Nagaokakyo (JP);
Sumiyo Nakamura, Nagaokakyo (JP)

(73) Assignee: MURATA MANUFACTURING CO., LTD, Kyoto (JP)

( * ) Notice: Subject to any disclaimer, the term of this patent is extended or adjusted under 35 U.S.C. 154(b) by 617 days.

(21) Appl. No.: 16/383,919

(22) Filed: Apr. 15, 2019

(65) Prior Publication Data
US 2019/0244749 A1   Aug. 8, 2019

Related U.S. Application Data

(63) Continuation of application No. PCT/JP2017/039985, filed on Nov. 6, 2017.

(30) Foreign Application Priority Data

Dec. 20, 2016 (JP) .............................. JP2016-247035
Feb. 6, 2017 (JP) .............................. JP2017-019753

(51) Int. Cl.
*H01F 27/29*     (2006.01)
*H01F 41/076*    (2016.01)
(Continued)

(52) U.S. Cl.
CPC ............. *H01F 27/29* (2013.01); *H01F 27/00* (2013.01); *H01F 41/076* (2016.01); *H01F 41/10* (2013.01); *H01G 4/228* (2013.01); *H01G 4/252* (2013.01)

(58) Field of Classification Search
USPC ......................................... 336/192, 198, 200
See application file for complete search history.

(56) References Cited

U.S. PATENT DOCUMENTS

| 5,757,076 A | * | 5/1998 | Kambara | ................ | H01C 1/142 |
| | | | | | 257/773 |
| 6,194,248 B1 | * | 2/2001 | Amaya | .................... | H01G 4/06 |
| | | | | | 336/200 |

(Continued)

FOREIGN PATENT DOCUMENTS

| CN | 1411143 A | 4/2003 |
| JP | 2004-259991 A | 9/2004 |

(Continued)

OTHER PUBLICATIONS

Official Communication issued in International Patent Application No. PCT/JP2017/039985, dated Jan. 23, 2018.

(Continued)

*Primary Examiner* — Shawki S Ismail
*Assistant Examiner* — Kazi S Hossain
(74) *Attorney, Agent, or Firm* — Keating & Bennett, LLP

(57) ABSTRACT

An electronic component includes an element body and outer electrodes on the element body. The element body includes top and bottom opposed surfaces, and side surfaces connecting the top and bottom surfaces. An outer electrode includes a lower layer electrode on the top surface and the bottom surface, and an upper layer electrode overlying the lower layer electrode and extending from an upper side of the lower electrode onto the side surface. When viewed from a direction orthogonal to the top and bottom surfaces, an edge of the lower layer electrode is disposed at a position farther from the side surface at which the upper layer electrode is provided than a position of an edge of the upper layer electrode, and a radius of curvature of the edge of the (Continued)

lower electrode is larger than a radius of curvature of the edge of the upper layer electrode.

19 Claims, 10 Drawing Sheets

(51) Int. Cl.
*H01G 4/228* (2006.01)
*H01F 27/00* (2006.01)
*H01F 41/10* (2006.01)
*H01G 4/252* (2006.01)

(56) References Cited

U.S. PATENT DOCUMENTS

| | | | | |
|---|---|---|---|---|
| 2003/0080830 A1* | 5/2003 | Matsumura | .......... | H03H 7/0115 333/185 |
| 2005/0181684 A1* | 8/2005 | Ito | ........................ | H05K 3/3442 439/894 |
| 2010/0304125 A1 | 12/2010 | Kawamura et al. | | |
| 2016/0268044 A1 | 9/2016 | Gu et al. | | |
| 2017/0338397 A1 | 11/2017 | Nakamura et al. | | |

FOREIGN PATENT DOCUMENTS

| | | | |
|---|---|---|---|
| JP | 2008-078453 A | | 4/2008 |
| JP | 2009-206110 A | | 9/2009 |
| JP | 2009206110 A | * | 9/2009 |
| JP | 2009-239094 A | | 10/2009 |
| JP | 2012-069912 A | | 4/2012 |
| JP | 2012069912 A | * | 4/2012 |
| JP | 2012-256947 A | | 12/2012 |
| JP | 2015-039016 A | | 2/2015 |
| JP | 2016-063008 A | | 4/2016 |
| WO | 2016/143619 A1 | | 9/2016 |

OTHER PUBLICATIONS

Official Communication issued in corresponding Chinese Patent Application No. 201780071627.8, dated Dec. 29, 2020.

* cited by examiner

ELECTRONIC COMPONENT AND MANUFACTURING METHOD FOR THE SAME

CROSS REFERENCE TO RELATED APPLICATIONS

This application claims the benefit of priority to Japanese Patent Application No. 2016-247035 filed on Dec. 20, 2016 and Japanese Patent Application No. 2017-019753 filed on Feb. 6, 2017, and is a Continuation Application of PCT Application No. PCT/JP2017/039985 filed on Nov. 6, 2017. The entire contents of each of these applications are hereby incorporated herein by reference.

BACKGROUND OF THE INVENTION

1. Field of the Invention

The present invention relates to an electronic component and a manufacturing method for the same.

2. Description of the Related Art

A known electronic component is disclosed in Japanese Unexamined Patent Application Publication No. 2016-63008. This electronic component includes an element body and a pair of terminal electrodes provided on an outer surface of the element body. The element body includes a pair of end surfaces and a circumferential surface between the pair of end surfaces. One of the terminal electrodes covers one of the end surfaces and one end surface side of the circumferential surface. A portion of the one of the terminal electrodes located on the circumferential surface projects toward the other one of the end surfaces. An edge shape of this projecting portion of the terminal electrode is a convex curved line. The same applies to the other one of the terminal electrodes.

However, it has been discovered that, when the known electronic component is mounted on a mounting substrate, there arises a problem as follows. When the terminal electrode of the electronic component is bonded to the mounting substrate by solder, the solder extends to the edge of the projecting portion of the terminal electrode. The solder shrinks when it is cooled, and it has been discovered that, at the time of the solder shrinkage, there is a risk of a crack being generated in the electronic component from the vicinity of the apex of the convex curved line of the edge of the terminal electrode.

SUMMARY OF THE INVENTION

Preferred embodiments of the present invention provide electronic components that are each capable of reducing or preventing cracks, and also provide manufacturing methods for the electronic components.

An electronic component according to a preferred embodiment of the present invention includes an element body and a plurality of outer electrodes provided on the element body, wherein the element body includes a top surface, a bottom surface opposing the top surface, and a plurality of side surfaces connecting the top surface and the bottom surface, the plurality of outer electrodes include a lower layer electrode provided on at least one of the top surface and the bottom surface, and an upper layer electrode that overlies the lower layer electrode and extends from an upper side of the lower layer electrode onto the side surface, and when viewed from a direction orthogonal or substantially orthogonal to the top surface and the bottom surface, an edge of the lower layer electrode is disposed at a position farther from the side surface at which the upper layer electrode is provided than a position of an edge of the upper layer electrode, and a radius of curvature of the edge of the lower layer electrode is larger than a radius of curvature of the edge of the upper layer electrode.

Here, the radius of curvature of the edge of the lower layer electrode may be in a range including an infinite radius of curvature, such that the edge of the lower layer electrode has a straight line shape.

In an electronic component according to a preferred embodiment of the present invention, when the outer electrode of the electronic component is joined to a mounting substrate by solder at the time of the electronic component being mounted on the mounting substrate, the solder extends to the edge of the lower layer electrode because the edge of the lower layer electrode is disposed at the position farther from the side surface at which the upper layer electrode is provided than the position of the edge of the upper layer electrode.

When the solder is cooled, the solder shrinks, such that a shrinkage force of the solder is applied to the edge of the lower layer electrode. However, since the radius of curvature of the edge of the lower layer electrode is larger than the radius of curvature of the edge of the upper layer electrode, stress concentration of the solder generated at the edge of the lower layer electrode is able to be reduced or prevented. Accordingly, it is possible to reduce or prevent a crack of the electronic component generated from the vicinity of the edge of the lower layer electrode due to the stress of the solder.

In a preferred embodiment of the electronic component, the width of the upper layer electrode is larger than that of the lower layer electrode.

Here, the width refers to a size in a direction along the side surface at which the upper layer electrode is provided, when viewed from a direction orthogonal or substantially orthogonal to the top surface and the bottom surface.

According to the above-described preferred embodiment, in a manufacturing process, a corner portion of the element body may be shaved after the lower layer electrode is provided on the element body. At this time, the lower layer electrode is also shaved simultaneously. However, since the upper layer electrode having a width larger than the width of the lower layer electrode is provided on the lower layer electrode, the upper layer electrode is able to be reliably connected to the lower layer electrode.

In the case in which the upper layer electrode is applied onto the lower layer electrode by dipping, even if a positional shift of application of the upper layer electrode occurs in the width direction, the upper layer electrode being positionally shifted is not connected to or close to another lower layer electrode adjacent to the upper layer electrode because the width of the lower layer electrode is smaller than the width of the upper layer electrode.

In a preferred embodiment of the electronic component, the shape of the edge of the lower layer electrode is a straight line.

According to the above-described preferred embodiment, stress concentration of the solder generated at the edge of the lower layer electrode is able to be reliably reduced or prevented, so that a crack of the electronic component due to the stress of the solder is able to be further reduced or prevented.

In addition, in a preferred embodiment of the electronic component, in a cross section at the center or approximate center in a width direction of the lower layer electrode, the thickness of the lower layer electrode is increased toward the side surface.

According to the above-described preferred embodiment, since the thickness of the lower layer electrode becomes thicker toward the side surface, a contact area between a portion on the side surface side of the lower layer electrode and the upper layer electrode is increased. This makes it possible to more reliably connect the upper layer electrode to the lower layer electrode.

In a preferred embodiment of the electronic component, the upper layer electrode and the lower layer electrode each include a contact surface having a convexo-concave shape, and the contact surfaces are in close contact with each other.

According to the above-described preferred embodiment, the contact surfaces of the upper layer electrode and lower layer electrode each having the convexo-concave shape are brought into close contact with each other. Thus, the upper layer electrode and the lower layer electrode are firmly connected to each other by an anchor effect.

In a preferred embodiment of the electronic component, the plurality of outer electrodes is provided on a single side surface.

According to the above-described preferred embodiment, even if the plurality of outer electrodes is provided on the single side surface, a crack of the electronic component due to the stress of the solder is able to be reduced or prevented.

In a preferred embodiment of the electronic component, the width of a portion of the upper layer electrode overlying the side surface increases toward the top surface as well as toward the bottom surface from the center or approximate center in a height direction of the overlying portion.

Here, the height direction refers to a direction orthogonal or substantially orthogonal to the top surface and the bottom surface, when viewed from a direction orthogonal or substantially orthogonal to the side surface.

In a preferred embodiment of the electronic component, the shape of the edge of the lower layer electrode on a side of the side surface at which the upper layer electrode provided is a convex curved line.

In a preferred embodiment of the electronic component, a thermal shrinkage rate of the lower layer electrode is smaller than a thermal shrinkage rate of the upper layer electrode.

According to the above-described preferred embodiment, since the thermal shrinkage rate of the lower layer electrode is smaller than the thermal shrinkage rate of the upper layer electrode, the amount of shrinkage, due to firing, of the lower layer electrode is smaller than that of the upper layer electrode. With this, the lower layer electrode between the element body and the upper layer electrode is able to reduce the difference in shrinkage amounts between the element body and the upper layer electrode, such that the lower layer electrode is able to reduce or prevent a situation in which the stress of the upper layer electrode is applied to the element body. Accordingly, in the case in which the electronic component is mounted on the mounting substrate and then an impact force is applied to the electronic component by dropping, for example, even if the stress of the solder is applied to the upper layer electrode and additional stress is generated in the upper layer electrode, the presence of the lower layer electrode is able to reduce or prevent a situation in which the stress of the upper layer electrode is applied to the element body, such that the damage to the element body due to the dropping is able to be further reduced or prevented.

In a preferred embodiment of the electronic component, the lower layer electrode includes oxide, and the upper layer electrode includes oxide different from the oxide in the lower layer electrode.

According to the above-described preferred embodiment, the thermal shrinkage rate of the lower layer electrode and that of the upper layer electrode are different from each other.

Further, in a preferred embodiment of the electronic component, the oxide of the lower layer electrode is $Al_2O_3$.

According to the above-described preferred embodiment, by using $Al_2O_3$ for the lower layer electrode, it is possible to lower the thermal shrinkage rate of the lower layer electrode.

In a preferred embodiment of the electronic component, the oxide of the upper layer electrode is $TiO_2$.

According to the above-described preferred embodiment, by using $TiO_2$ for the upper layer electrode, a reaction layer having high affinity is able to be provided at a boundary between the upper layer electrode and the element body and a boundary between the upper layer electrode and the lower layer electrode, and fixing strength between the upper layer electrode and the element body and fixing strength between the upper layer electrode and the lower layer electrode are able to be improved.

In a preferred embodiment of the electronic component, an amount of Al in the lower layer electrode is equal to or more than about 5 vol % and equal to or less than about 60 vol %.

According to the above-described preferred embodiment, it is possible to further improve the drop strength of the electronic component and to improve the firing of the lower layer electrode.

Further, in a preferred embodiment of the electronic component, an amount of Ti in the upper layer electrode is equal to or more than about 5 vol % and equal to or less than about 60 vol %.

According to the above-described preferred embodiment, it is possible to further improve the drop strength of the electronic component and to improve the firing of the upper layer electrode.

A manufacturing method for an electronic component according to a preferred embodiment of the present invention includes preparing an element body including a top surface, a bottom surface opposing the top surface, and a plurality of side surfaces connecting the top surface and the bottom surface, providing a lower layer electrode of an outer electrode on at least one of the top surface and the bottom surface, and providing an upper layer electrode of the outer electrode such that the upper layer electrode overlies the lower layer electrode and extends from an upper side of the lower layer electrode onto the side surface of the element body, wherein, when viewed from a direction orthogonal or substantially orthogonal to the top surface and the bottom surface, an edge of the lower layer electrode is disposed at a position farther from the side surface at which the upper layer electrode is to be provided than a position of an edge of the upper layer electrode, and a radius of curvature of the edge of the lower layer electrode is larger than a radius of curvature of the edge of the upper layer electrode.

According to the above-described preferred embodiment, it is possible to manufacture an electronic component capable of reducing or preventing a crack due to the stress of the mounting solder.

Further, in a preferred embodiment of the manufacturing method for the electronic component, in the providing of the lower layer electrode, the lower layer electrode is formed by print coating, and a shape of the edge of the lower layer electrode is a straight line, and, in the providing of the upper layer electrode, the upper layer electrode is formed by dip coating.

According to the above-described preferred embodiment, since the lower layer electrode is formed by print coating, the shape of the edge of the lower layer electrode is able to be easily formed as a straight line. Since the upper layer electrode is formed by dip coating, the upper layer electrode is able to be formed with ease.

In a preferred embodiment of the electronic component, in the providing of the lower layer electrode, the thickness of the lower layer electrode in a cross section at the center or approximate center in a width direction of the lower layer electrode is increased toward the side surface.

According to the above-described preferred embodiment, since the thickness of the lower layer electrode is increased toward the side surface, a contact area between a portion on the side surface side of the lower layer electrode and the upper layer electrode is able to be increased. This makes it possible to more reliably connect the upper layer electrode to the lower layer electrode.

Further, in a preferred embodiment of the manufacturing method for the electronic component, the lower layer electrode is provided on a mother substrate of element bodies including two chip regions such that the lower layer electrode extends over the two chip regions and a central portion of the lower layer electrode having a thick film thickness overlaps with a boundary between the two chip regions, and then the mother substrate is cut at the boundary along with the lower layer electrode to form the element body and the thickness of the lower layer electrode is increased toward the side surface of the element body.

According to the above-described preferred embodiment, the lower layer electrode extends over two chip regions and thereafter is cut, thus making it possible to form two chips at a time, each including a lower layer electrode with a predetermined thickness.

In a preferred embodiment of the manufacturing method for the electronic component, in the providing of the upper layer electrode, a medium is caused to collide against an overlapping portion of the upper layer electrode and the lower layer electrode so that a contact surface formed in a convexo-concave shape of the upper layer electrode and a contact surface formed in a convexo-concave shape of the lower layer electrode are brought into close contact with each other.

According to the above-described preferred embodiment, the contact surfaces of the upper layer electrode and lower layer electrode each formed in the convexo-concave shape are brought into close contact with each other. Thus, the upper layer electrode and the lower layer electrode are firmly connected to each other by the anchor effect.

According to preferred embodiments of the present invention, it is possible to provide electronic components each capable of reducing or preventing a crack.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

As described above, in the known electronic component, there is a risk that a crack is generated in the electronic component from the vicinity of the apex of the convex curved line of the edge of the terminal electrode. As a result of intensive research, it has been discovered that, when the solder is cooled, the solder shrinks so that the shrinkage force of the solder is applied to the edge of the projecting portion of the terminal electrode. Further, it has been discovered that, since the shape of the edge of the projecting portion of the terminal electrode is a convex curved line, the shrinkage force (stress) of the solder is concentrated on the apex of the convex curved line, and as a result, a crack is generated in the electronic component from the vicinity of the apex of the convex curved line of the edge of the terminal electrode.

The inventors of preferred embodiments of the present invention have developed a configuration in which a lower layer electrode underlies an upper layer electrode corresponding to the terminal electrode of the known art. In addition, an edge of the lower layer electrode is provided at a position farther from the upper layer electrode than a position of an edge of the upper layer electrode, so that the stress of the solder is applied to the edge of the lower layer electrode rather than to the edge of the upper layer electrode. Further, by making a radius of curvature of the edge of the lower layer electrode larger than a radius of curvature of the edge of the upper layer electrode, concentration of the stress of the solder generated at the edge of the lower layer electrode is reduced or prevented. Thus, a crack of the electronic component generated from the vicinity of the edge of the lower layer electrode due to the stress of the solder is reduced or prevented. Furthermore, by making a material of the lower layer electrode and a material of the upper layer electrode different from each other so as to make a shrinkage rate of the lower layer electrode smaller than that of the upper layer electrode, it is possible to reduce or prevent, by the lower layer electrode, a difference in shrinkage amounts between the element body and the upper layer electrode due to firing, and to reduce or prevent the stress of the upper layer electrode being applied to the element body, thus further reducing or preventing the damage caused by being dropped.

Preferred embodiments of the present invention have been developed based on the above discoveries originally made by the inventors of preferred embodiments of the present invention.

Hereinafter, the present invention will be described in more detail with reference to preferred embodiments illustrated in the accompanying drawings.

First Preferred Embodiment

Figure 1:
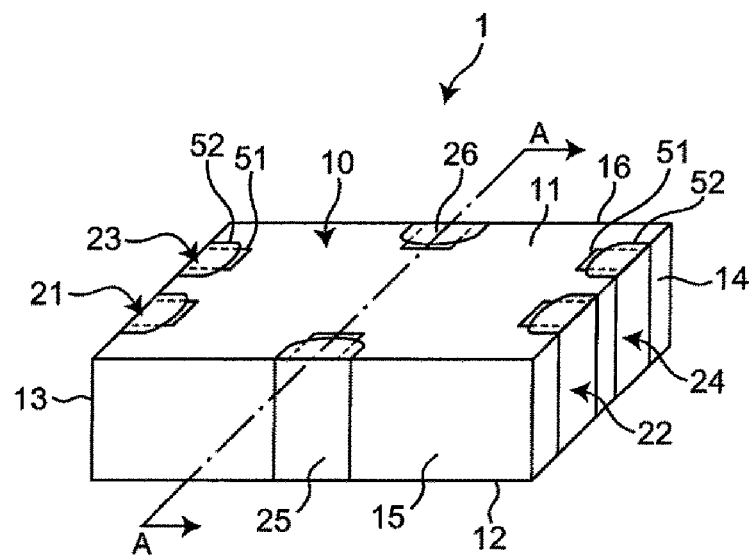
FIG. 1 is a perspective view illustrating a first preferred embodiment of an electronic component of the present invention.
Figure 2:
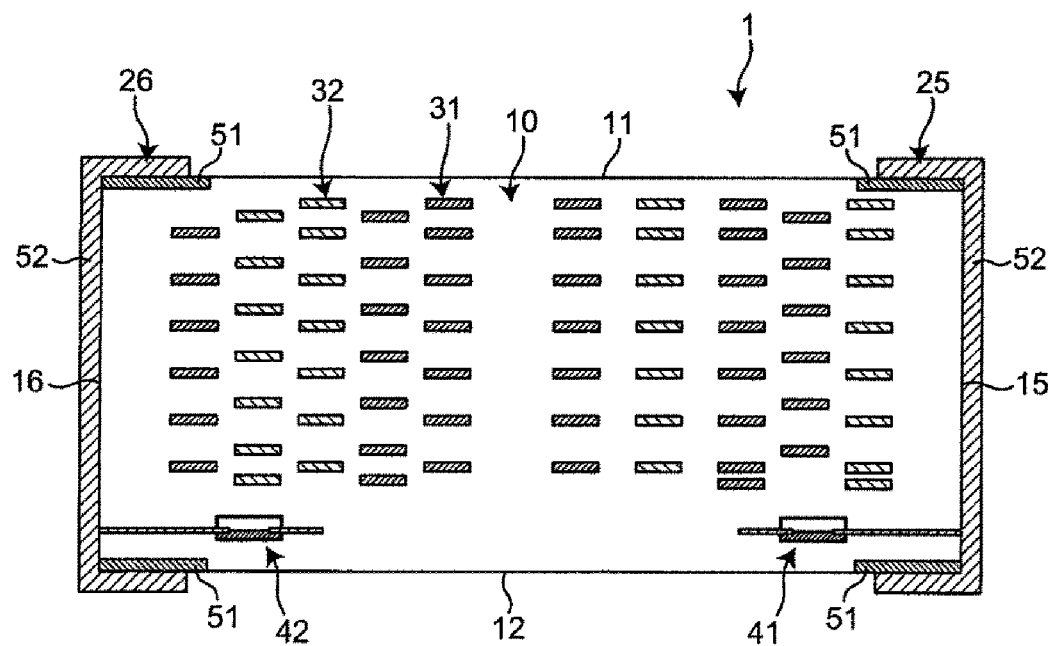
FIG. 2 is a cross-sectional view taken along a line A-A in FIG. 1.

FIG. 1 is a perspective view illustrating a first preferred embodiment of an electronic component of the present invention. FIG. 2 is a cross-sectional view taken along a line A-A in FIG. 1. As illustrated in FIG. 1 and FIG. 2, an electronic component 1 is a common mode choke coil including an ESD protection element. The electronic component 1 includes an element body 10, a first coil 31 and a second coil 32 provided inside the element body 10, a first discharge element 41 and a second discharge element 42 provided inside the element body 10, and first to sixth outer electrodes 21 to 26 provided in or on the element body 10.

The element body 10 includes a top surface 11, a bottom surface 12 opposing the top surface 11, and first to fourth side surfaces 13 to 16 connecting the top surface 11 and the bottom surface 12. The first side surface 13 and the second side surface 14 oppose each other, and the third side surface 15 and the fourth side surface 16 oppose each other. The element body 10 is preferably made of ceramic, for example, and the material of the ceramic is preferably, for example, a material having a composition of Ba, Al, and Si as main ingredients. The element body 10 is preferably, for example, a ceramic multilayer substrate.

The first coil 31 and the second coil 32 have spiral shapes and are wound in opposite directions to each other. Each of the first coil 31 and the second coil 32 is defined by a plurality of spiral conductor layers. The first coil 31 and the second coil 32 are magnetically coupled to each other, and define the common mode choke coil.

Each of the first discharge element 41 and the second discharge element 42 includes a pair of discharge electrodes spaced from each other, and a discharge auxiliary electrode that bridges the pair of discharge electrodes. The pair of discharge electrodes and the discharge auxiliary electrode are located in a cavity inside the element body 10. A sealing layer is provided on an inner surface of the cavity. The sealing layer prevents a glass component from entering into the discharge auxiliary electrode from the ceramic element body. When a high voltage is applied between the pair of discharge electrodes, a creeping discharge of the discharge auxiliary electrode, an aerial discharge in the gap between the pair of discharge electrodes, and a discharge inside the discharge auxiliary electrode occur, so that static electricity is discharged by these discharges.

The first outer electrode 21 extends over the first side surface 13 side of the top surface 11, the first side surface 13, and the first side surface 13 side of the bottom surface 12. Similarly, the second outer electrode 22 opposes the first outer electrode 21, and extends over the top surface 11, the second side surface 14, and the bottom surface 12.

The third outer electrode 23 is located adjacent to the first outer electrode 21, and extends over the top surface 11, the first side surface 13, and the bottom surface 12. The fourth outer electrode 24 opposes the third outer electrode 23, and extends over the top surface 11, the second side surface 14, and the bottom surface 12.

The fifth outer electrode 25 extends over the top surface 11, the third side surface 15, and the bottom surface 12. The sixth outer electrode 26 opposes the fifth outer electrode 25, and extends over the top surface 11, the fourth side surface 16, and the bottom surface 12.

Figure 3:
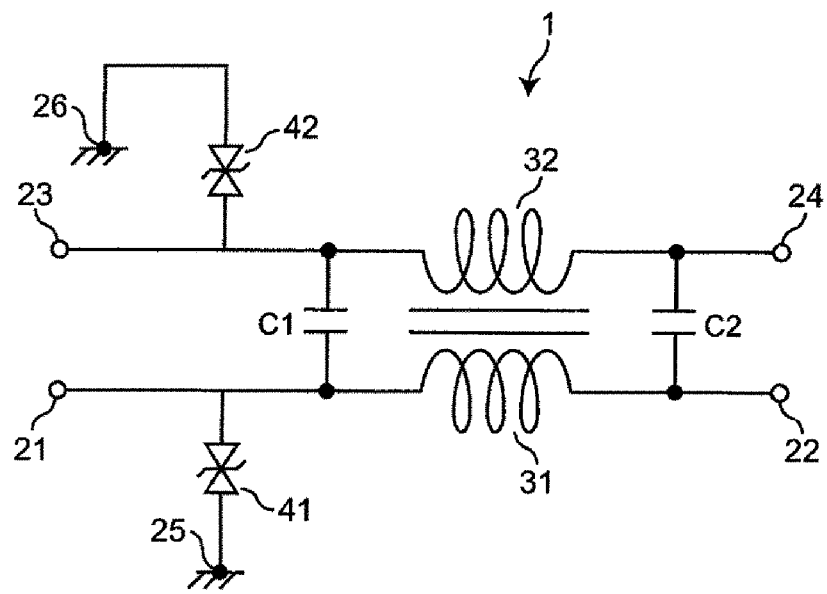
FIG. 3 is an equivalent circuit diagram of an electronic component.

FIG. 3 is an equivalent circuit diagram of the electronic component 1. One end of the first coil 31 is connected to the first outer electrode 21, and the other end of the first coil 31 is connected to the second outer electrode 22. One end of the second coil 32 is connected to the third outer electrode 23, and the other end of the second coil 32 is connected to the fourth outer electrode 24. The first discharge element 41 is connected between the one end of the first coil 31 and the fifth outer electrode 25, and the second discharge element 42 is connected between the one end of the second coil 32 and the sixth outer electrode 26. The fifth outer electrode 25 and the sixth external electrode 26 are each connected to the ground. Capacitors C1 and C2 equivalently represent stray capacitance between the first coil 31 and the second coil 32.

As illustrated in FIG. 1, each of the first to sixth outer electrodes 21 to 26 includes a lower layer electrode 51 and an upper layer electrode 52. Hereinafter, the lower layer electrode 51 and the upper layer electrode 52 of the first outer electrode 21 will be described. Since the lower layer electrode 51 and the upper layer electrode 52 of the second to sixth outer electrodes 22 to 26 are the same or substantially the same as those of the first outer electrode 21, description thereof will be omitted.

Figure 4:
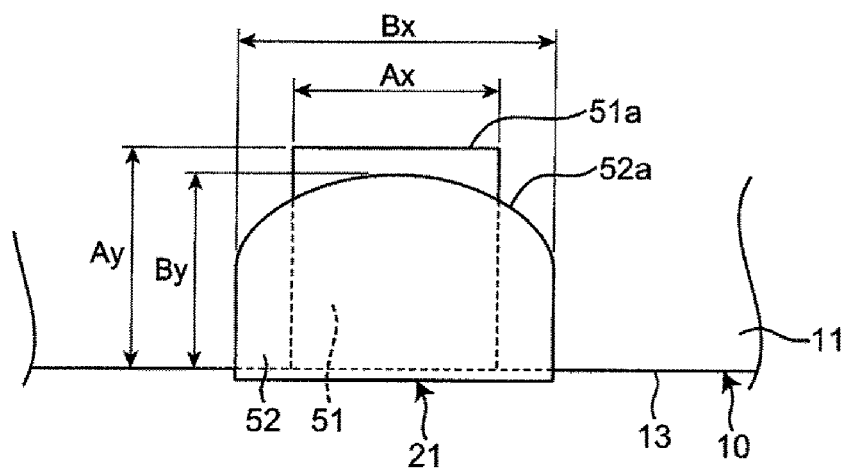
FIG. 4 is a plan view of a first outer electrode seen from a top surface side.

As illustrated in FIG. 1 and FIG. 4, the first outer electrode 21 includes the lower layer electrode 51 provided on the top surface 11 and the bottom surface 12, and the upper layer electrode 52 that overlies the lower layer electrode 51 and extends from an upper side of the lower layer surface 51 onto the first side surface 13.

The lower layer electrode 51 is preferably provided only on the top surface 11 and the bottom surface 12. The upper layer electrode 52 extends over the top surface 11, the first side surface 13, and the bottom surface 12. The upper electrode 52 overlies the lower layer electrode 51 at the top surface 11 and the bottom surface 12. Hereinafter, the lower layer electrode 51 on the top surface 11 side will be described. Since the lower layer electrode 51 on the bottom surface 12 side is the same or substantially the same as the lower layer electrode 51 on the top surface 11 side, description thereof will be omitted.

When viewed from a direction orthogonal or substantially orthogonal to the top surface 11 and the bottom surface 12, an edge 51a of the lower layer electrode 51 is disposed at a position farther from the first side surface 13 provided with the upper layer electrode 52 than a position of an edge 52a of the upper layer electrode 52. Specifically, a length Ay of the lower layer electrode 51 from the first side surface 13 to the edge 51a of the lower layer electrode 51 is longer than a length By of the upper layer electrode 52 from the first side surface 13 to the edge 52a of the upper layer electrode 52.

In addition, the radius of curvature of the edge 51a of the lower layer electrode 51 is preferably larger than the radius of curvature of the edge 52a of the upper layer electrode 52. To be specific, the radius of curvature of the edge 51a of the lower layer electrode 51 is preferably infinite, that is, the shape of the edge 51a of the lower layer electrode 51 is a straight line. The shape of the edge 52a of the upper layer electrode 52 is a convex curved line.

A width Bx of a portion overlapping the lower layer electrode 51, which is a width of the upper layer electrode 52, is larger than a width Ax of the lower layer electrode 51. Here, the width refers to a dimension in a direction along the first side surface 13 at which the upper layer electrode 52 is provided when viewed from the direction orthogonal or substantially orthogonal to the top surface 11 and the bottom surface 12.

According to the electronic component 1, when the outer electrodes 21 to 26 of the electronic component 1 are each joined to a mounting substrate by solder at the time of the electronic component 1 being mounted on the mounting substrate, the solder extends to the edge 51a of the lower layer electrode 51 because the edge 51a of the lower layer electrode 51 is disposed at the position farther from the first side surface 13 at which the upper layer electrode 52 is provided than the position of the edge 52a of the upper layer electrode 52.

Then, when the solder is cooled, the solder shrinks, such that a shrinkage force of the solder is applied to the edge 51a of the lower layer electrode 51. However, since the radius of curvature of the edge 51a of the lower layer electrode 51 is larger than the radius of curvature of the edge 52a of the upper layer electrode 52, stress concentration of the solder generated at the edge 51a of the lower layer electrode 51 is able to be reduced or prevented. Accordingly, it is possible to reduce or prevent a crack of the electronic component 1 generated from the vicinity of the edge 51a of the lower layer electrode 51 due to the stress of the solder.

Further, after the mounting of the electronic component 1 on the mounting substrate, even if a drop impact or other force is applied to the electronic component 1 and then an impact force (stress) is applied to the edge 51a of the lower layer electrode 51 via the solder, the stress concentration of the solder is able to be reduced or prevented, such that the electronic component 1 does not suffer a loss, a crack, or other damage.

In particular, since the shape of the edge 51a of the lower layer electrode 51 is preferably a straight line, the portion on which the solder stress is concentrated is a line, such that the occurrence of a crack in the electronic component 1 is able to be reliably reduced or prevented. Further, although the plurality of outer electrodes are provided on the single side surface, a crack of the electronic component 1 due to the solder stress is able to be reduced or prevented.

Furthermore, since the width Bx of the portion of the upper layer electrode 52 overlapping the lower layer electrode 51 is larger than the width Ax of the lower layer electrode 51, the following advantageous effects are obtained.

Figure 5A:
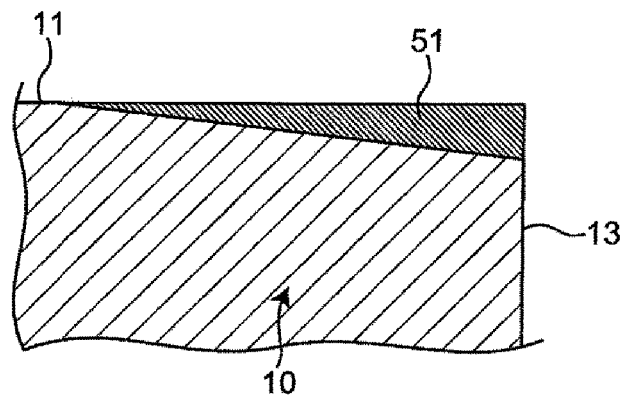
FIG. 5A is a cross-sectional view when a lower layer electrode is provided.
Figure 5B:
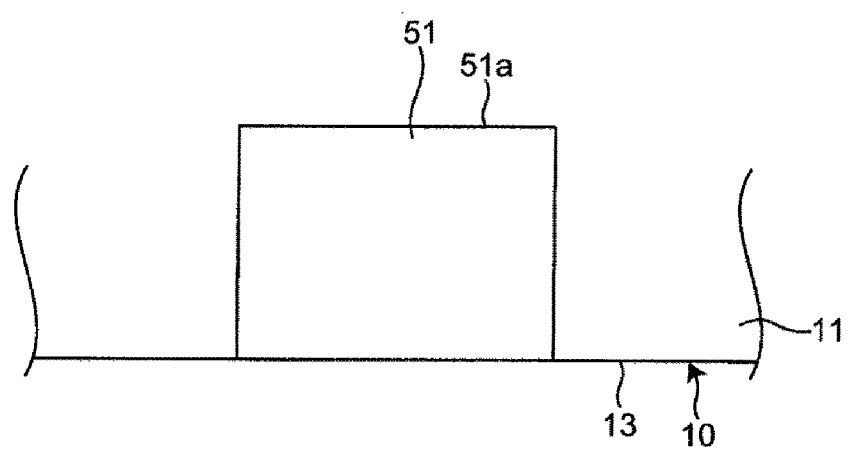
FIG. 5B is a plan view when a lower layer electrode is provided.
Figure 6A:
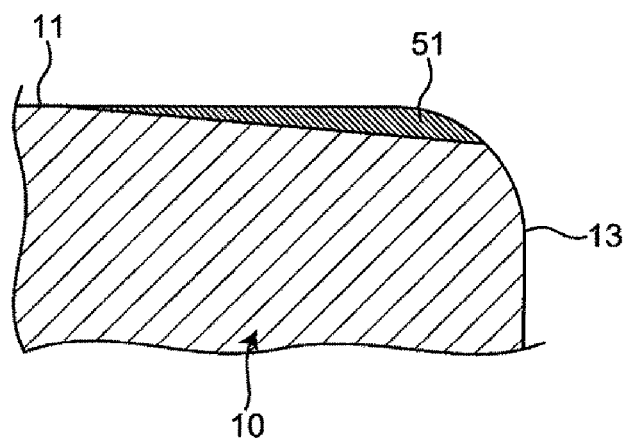
FIG. 6A is a cross-sectional view when a lower layer electrode is shaved.
Figure 6B:
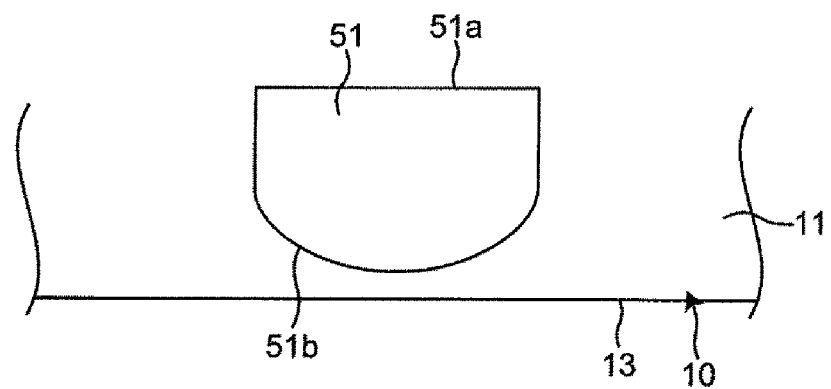
FIG. 6B is a plan view when a lower layer electrode is shaved.
Figure 6C:
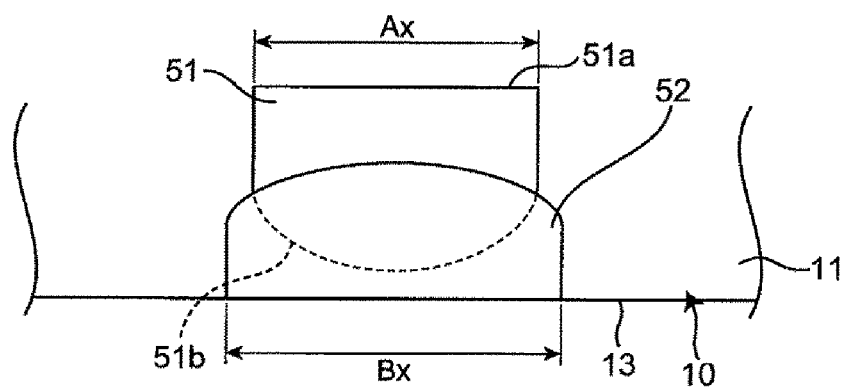
FIG. 6C is a plan view when an upper layer electrode is provided.

In the manufacturing process, after the lower layer electrode 51 is provided on the element body 10, a corner portion of the top surface 11 and the side surface 13 of the element body 10 is shaved in some cases. Specifically, as illustrated in FIGS. 5A and 5B, when the lower layer electrode 51 is provided on the element body 10, the lower layer electrode 51 extends to the corner portion of the element body 10. Thereafter, the corner portion of the element body 10 is shaved, and at this time, as illustrated in FIGS. 6A and 6B, the lower layer electrode 51 is also shaved simultaneously. The shape of the edge 51b on the side surface 13 side of the lower layer electrode 51 is preferably a convex curved line, which is a shape without a corner. Thereafter, as illustrated in FIG. 6C, since the upper layer electrode 52 having the width Bx larger than the width Ax of the lower layer electrode 51 is provided on the lower layer electrode 51, even in the case in which the lower layer electrode 51 is shaved to be reduced, the upper layer electrode 52 is able to be reliably connected to the lower layer electrode 51.

Here, the shape of the edge 51b of the lower layer electrode 51 on a side of the side surface 13 at which the upper layer electrode 52 is provided is preferably a convex curved line. In this case, when the lower layer electrode 51 is applied onto the element body 10 by printing in the manufacturing process, the thickness of the lower layer electrode 51 becomes thicker toward the center or approximate center in the width Ax direction of the lower layer electrode 51 due to the influence of the surface tension. Then, when the corner portion of the element body 10 is shaved after the lower layer electrode 51 has been provided on the element body 10, the lower layer electrode 51 is also shaved at the same time. However, since the thickness at the center or approximate center in the width Ax direction of the lower layer electrode 51 is thick, the edge 51b on the side surface 13 side of the lower layer electrode 51 has a convex curved line shape whose center or approximate center in the width Ax direction becomes an apex.

Figure 7A:
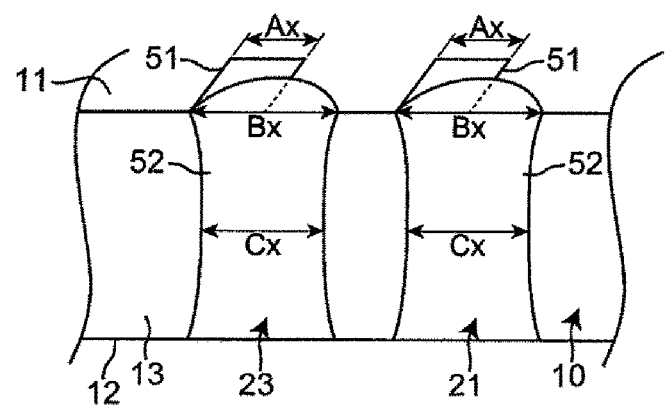
FIG. 7A is an explanatory diagram of a case in which a positional shift of application of an upper layer electrode occurs in the present preferred embodiment of the present invention.

In addition, as illustrated in FIG. 7A, in the case in which the upper layer electrode 52 is applied onto the lower layer electrode 51 by dipping, even if a positional shift of application of the upper layer electrode 52 occurs in the width direction (the right direction in the drawing), the upper layer electrode 52 being positionally shifted is not connected to or close to the lower layer electrode 51 adjacent to the upper layer electrode 52 in the width direction because the width Ax of the lower layer electrode 51 is smaller than the width Bx of the upper layer electrode 52. Accordingly, it is possible to prevent electrochemical migration due to a short circuit and proximity by the connection.

Figure 7B:
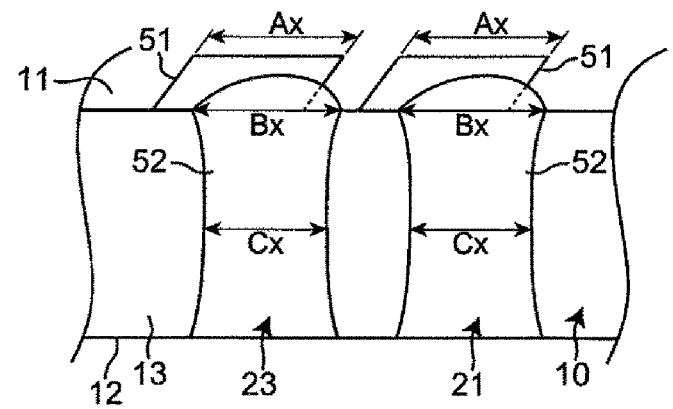
FIG. 7B is an explanatory diagram of a case where a positional shift of application of an upper layer electrode occurs in a comparative example.

In contrast, as illustrated in FIG. 7B, in the case in which the width Ax of the lower layer electrode 51 is equal to or larger than the width Bx of the upper layer electrode 52, the upper layer electrode 52 being positionally shifted may be connected to or close to the lower layer electrode 51 adjacent to the upper layer electrode 52 in the width direction.

Here, in order to prevent a mounting failure due to an insufficient wetting rise of the solder, it is preferable for a portion of the upper layer electrode 52 overlying the side surface 13 to be structured such that the width of the portion of the upper layer electrode 52 overlying the side surface 13 is as large as possible. In the case in which the upper layer electrode 52 is formed by dip coating, since the corner portion of the element body 10 is more likely to bleed than the side surface 13 of the element body 10, the portion of the upper layer electrode 52 overlying the side surface 13 is formed in a shape that is narrowed at the center or approximate center thereof. In other words, the width of the portion of the upper layer electrode 52 overlying the side surface 13 gradually increases from the center or approximate center in a height direction toward the top surface 11 and the bottom surface 12. The height direction refers to a direction orthogonal or substantially orthogonal to the top surface 11 and the bottom surface 12 when viewed from a direction orthogonal or substantially orthogonal to the side surface 13. As described above, a width Cx at the center or approximate center in the height direction of the upper layer electrode 52 is smaller than the width Bx on the top surface 11 side of the upper layer electrode 52.

Next, a non-limiting example of a manufacturing method for the electronic component 1 will be described with reference to FIG. 1 and FIG. 2.

First, the element body 10 including the top surface 11, the bottom surface 12, and the plurality of side surfaces 13 to 16 is prepared. Subsequently, the lower layer electrode 51 of each of the outer electrodes 21 to 26 is provided on the top surface 11 and the bottom surface 12 of the element body 10. Then, the upper layer electrode 52 of each of the outer electrodes 21 to 26 is provided overlying the lower layer electrode 51 and extending from an upper side of the lower layer electrode 51 onto each of the side surfaces 13 to 16 of the element body 10. At this time, when viewed from the direction orthogonal or substantially orthogonal to the top surface 11 and the bottom surface 12, the edge 51a of the lower layer electrode 51 is disposed at a position farther from each of the side surfaces 13 to 16 provided with the upper layer electrode 52 than a position of the edge 52a of the upper layer electrode 52. In addition, the radius of curvature of the edge 51a of the lower layer electrode 51 is larger than the radius of curvature of the edge 52a of the upper layer electrode 52. Accordingly, it is possible to manufacture the electronic component 1 capable of reducing or preventing a crack due to the stress of the mounting solder.

Further, in the process of providing the lower layer electrode 51, the lower layer electrode 51 is formed by print coating, and the shape of the edge 51a of the lower layer electrode 51 is formed to be a straight line. In the process of providing the upper layer electrode 52, the upper layer electrode 52 is formed by dip coating. Accordingly, since the lower layer electrode 51 is formed by print coating, the shape of the edge 51a of the lower layer electrode 51 is able to be easily formed to be a straight line. Since the upper layer electrode 52 is formed by dip coating, the upper layer electrode 52 is able to be formed with ease.

Second Preferred Embodiment

Figure 8:
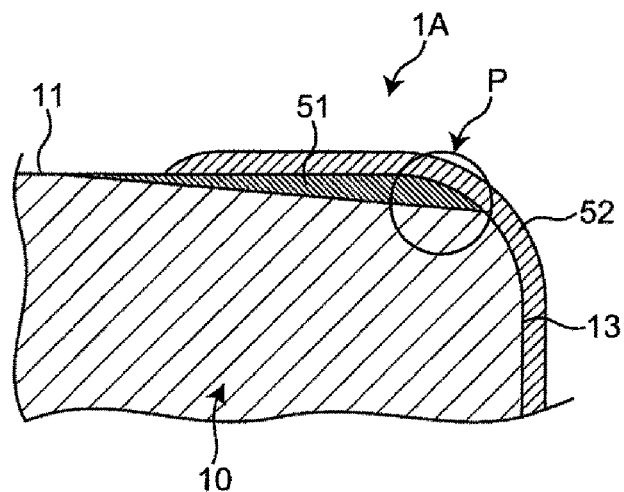
FIG. 8 is a cross-sectional view illustrating a second preferred embodiment of an electronic component of the present invention.

FIG. 8 is a cross-sectional view illustrating a second preferred embodiment of an electronic component of the present invention. The thickness of a lower layer electrode in the second preferred embodiment differs from the thickness of the lower layer electrode in the first preferred embodiment. The above-described different configuration will be described below. Since the remaining configuration is the same or substantially the same as that of the first preferred embodiment, the same reference signs as those in the first preferred embodiment are assigned thereto, and description thereof will be omitted.

As illustrated in FIG. 8, in an electronic component 1A of the second preferred embodiment, in a cross section at the center or approximate in a width direction of a lower layer electrode 51, the thickness of the lower layer electrode 51 is thicker toward a side surface 13. As discussed in the first preferred embodiment, the width direction is a direction along the first side surface 13 provided with an upper layer electrode 52 when viewed from a direction orthogonal or substantially orthogonal to a top surface 11, and is also a direction orthogonal or substantially orthogonal to the paper surface of FIG. 8.

More specifically, as indicated in a portion P in FIG. 8, at a corner portion of the top surface 11 and the side surface of the element body 10, the thickness of the lower layer electrode 51 is the thickest. Accordingly, since the thickness of the lower layer electrode 51 becomes thicker toward the side surface 13, a contact area between a portion on the side surface side of the lower layer electrode 51 and the upper layer electrode 52 is increased. This makes it possible to more reliably connect the upper layer electrode 52 to the lower layer electrode 51.

Next, a non-limiting example of a manufacturing method for the electronic component 1A will be described. Since processes other than a process of providing the lower layer electrode 51 are the same or substantially the same as those of the first preferred embodiment, the process of providing the lower layer electrode 51 will be described below.

Figure 9A:
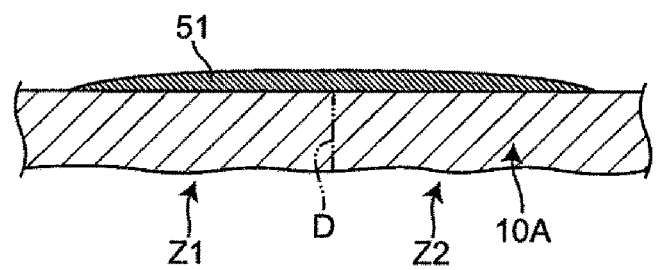
FIG. 9A is an explanatory diagram for explaining a process of providing a lower layer electrode.

As illustrated in FIG. 9A, the lower layer electrode 51 is provided on a mother substrate 10A of the element body 10 including two chip regions Z1 and Z2 such that the lower layer electrode 51 extends over the two chip regions Z1, Z2 and a central portion of the lower layer electrode 51 having a thick film thickness overlaps a boundary D between the two chip regions Z1 and Z2. Each of the chip regions Z1 and Z2 corresponds to each element body 10.

Figure 9B:
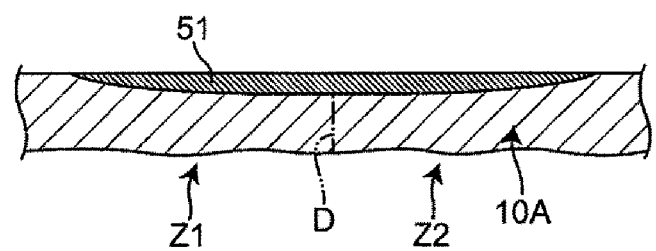
FIG. 9B is an explanatory diagram for explaining a process of providing a lower layer electrode.

Specifically, as illustrated in FIG. 9A, when the lower electrode 51 is applied by print coating so as to extend over the two chip regions Z1 and Z2, the film thickness of the portion of the lower layer electrode 51 overlapping the boundary D becomes thick. Then, as illustrated in FIG. 9B, due to a press process, the lower layer electrode 51 embeds into the mother substrate 10A.

Figure 9C:
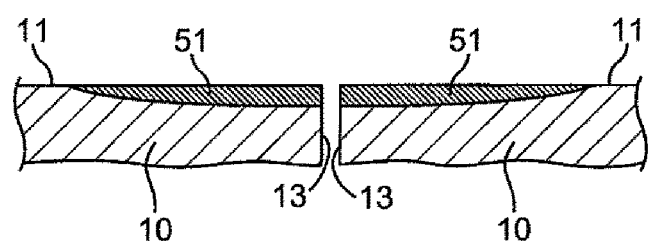
FIG. 9C is an explanatory diagram for explaining a process of providing a lower layer electrode.

Thereafter, as illustrated in FIG. 9C, the mother substrate 10A is cut along with the lower layer electrode 51 at the boundary D to form two element bodies 10. The thickness of the lower layer electrode 51 of the element body 10 in a cross section at the center or approximate center in the width direction of the lower layer electrode 51 is gradually increased toward the side surface 13 of the element body 10 having been cut.

Specifically, by cutting the mother substrate 10A to divide it into the individual element bodies 10, the lower layer electrode 51 is brought into a state of being exposed to a corner portion of the element body 10. Thereafter, even when the corner portion of the element body 10 is shaved by barrel finishing, since the thickness at the corner portion of the lower layer electrode 51 is thick, the thickness at the corner portion of the lower layer electrode 51 is able to be sufficiently maintained, and a connection failure between the lower layer electrode 51 and the upper layer electrode 52 is able to be prevented.

Accordingly, by providing the lower layer electrode 51 so as to extend over the two chip regions Z1 and Z2, and then by cutting it, two chips each including the lower layer electrode 51 with a predetermined thickness are formed at the same time.

Note that the lower layer electrodes 51 may be individually formed, and the thickness of each lower layer electrode 51 may be formed to be thick as discussed above.

Third Preferred Embodiment

Figure 10:
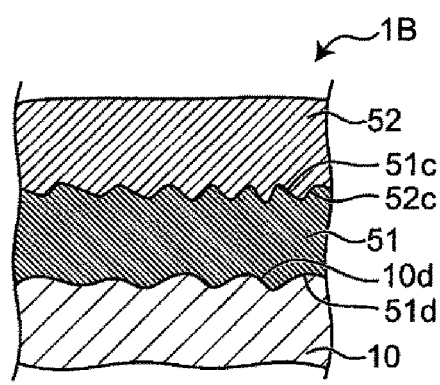
FIG. 10 is a cross-sectional view illustrating a third preferred embodiment of an electronic component of the present invention.

FIG. 10 is a cross-sectional view illustrating a third preferred embodiment of an electronic component of the present invention. A state of an interface between a lower layer electrode and an upper layer electrode in the third preferred embodiment differs from that in the first preferred embodiment. The above-described different configuration will be described below. The remaining configuration is the same or substantially the same as that of the first preferred embodiment, and description thereof will be omitted.

As illustrated in FIG. 10, in an electronic component 1B of the third preferred embodiment, an upper layer electrode 52 and a lower layer electrode 51 include contact surfaces 52c and 51c, respectively, having a convexo-concave shape. The contact surface 52c of the upper layer electrode 52 and the contact surface 51c of the lower layer electrode 51 are in close contact with each other with substantially no gaps therebetween. Thus, the upper layer electrode 52 and the lower layer electrode 51 are firmly connected to each other by an anchor effect. Preferably, a convexo-concave contact surface 51d of the lower layer electrode 51 and a convexo-concave contact surface 10d of an element body 10 are in close contact with each other with substantially no gaps therebetween, and the lower layer electrode 51 and the element body 10 are firmly connected to each other by the anchor effect.

Next, a non-limiting example of a manufacturing method for the electronic component 1B will be described. Since processes other than a process of providing the upper layer electrode 52 are the same or substantially the same as those of the first preferred embodiment, the process of providing the upper layer electrode 52 will be described below.

Figure 11:
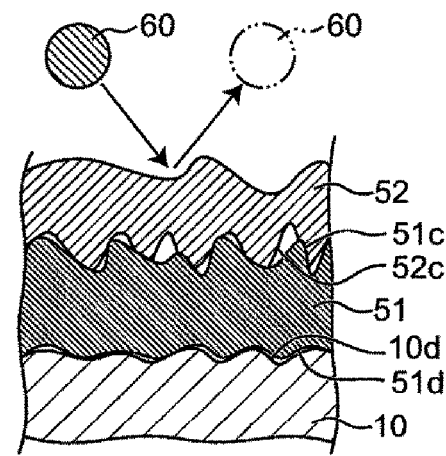
FIG. 11 is an explanatory diagram for explaining a colliding state of a medium.

As illustrated in FIG. 11, in the process of providing the upper layer electrode 52, a medium 60 is caused to collide against an overlapping portion of the upper layer electrode 52 and the lower layer electrode 51 so that the contact surface 52c having a convexo-concave shape of the upper layer electrode 52 and the contact surface 51c having a convexo-concave shape of the lower layer electrode 51 are brought into close contact with each other. Preferably, by the collision of the medium 60, the contact surfaces 51d and 10d having the convexo-concave shape of the lower layer electrode 51 and the element body 10 are brought into close contact with each other.

To be specific, an interface between the element body 10 and the lower layer electrode 51 and an interface between the lower electrode 51 and the upper layer electrode 52 have fixing strength due to a reaction layer formed during firing, but there is a gap (pore) in the interface due to a combustion gas, a difference in shrinkage behavior, or other factors at the time of firing.

For example, in the case in which a material capable of obtaining high fixing strength is used for the lower layer electrode 51 and a material capable of obtaining densification is used for the upper layer electrode 52, materials having different compositions (i.e., being different in sintering behavior) are used. At this time, a gap is easily formed in the interface.

Thereafter, physical energy (collision energy) is applied to an overlapping portion of the lower layer electrode 51 and the upper layer electrode 52 after the firing. This promotes the plastic deformation for each of the electrodes 51, 52 and increases the contact area by removing the gap and forming the anchor, thus making it possible to further improve the fixing strength. Note that, as the physical energy, a collision of a medium, such as sandblasting, for example, is effective.

Further, the surface of the lower layer electrode 51 and the surface of the upper layer electrode 52 remain in a discontinuous state if they are left unprocessed after the firing. Then, by applying physical energy also to these surfaces, the surfaces are formed to be continuous, thus making it possible to achieve trap suppression of a plating solution at the time of plating deposition, so as to deposit a uniform composite film, for example.

Fourth Preferred Embodiment

Figure 12:
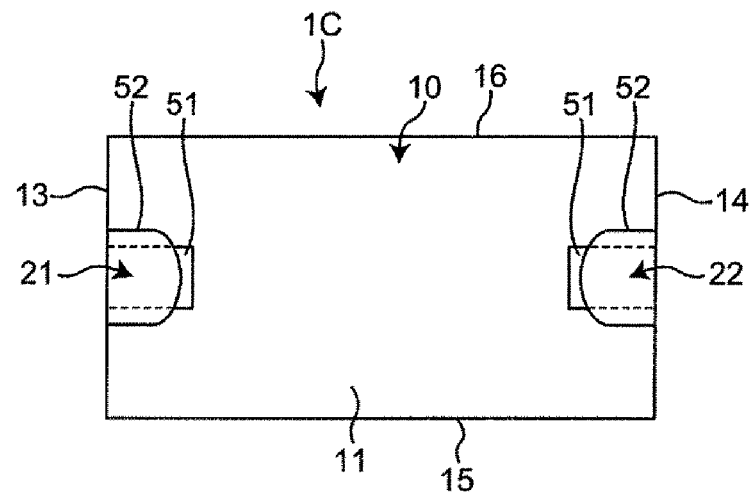
FIG. 12 is a plan view illustrating a fourth preferred embodiment of an electronic component of the present invention.

FIG. 12 is a plan view illustrating a fourth preferred embodiment of an electronic component of the present invention. The fourth preferred embodiment differs from the first preferred embodiment in that the number of outer electrodes is different from that of the first preferred embodiment. The above-described different configuration will be described below. Since the remaining configuration is the same or substantially the same as that of the first preferred embodiment, the same reference signs as those in the first preferred embodiment are assigned thereto, and description thereof will be omitted.

As illustrated in FIG. 12, in an electronic component 1C of the fourth preferred embodiment, the number of outer electrodes 21, 22 is preferably two, for example. The electronic component 1C does not include, for example, the discharge element of the first preferred embodiment, and includes a single coil. One end of the coil is connected to the first outer electrode 21, and the other end of the coil is connected to the second outer electrode 22. Each of the first and second outer electrodes 21 and 22 includes the lower layer electrode 51 and the upper layer electrode 52 of the first preferred embodiment. In the present preferred embodiment, the same or substantially the same advantageous effects as those of the first preferred embodiment are obtained.

Fifth Preferred Embodiment

Figure 13:
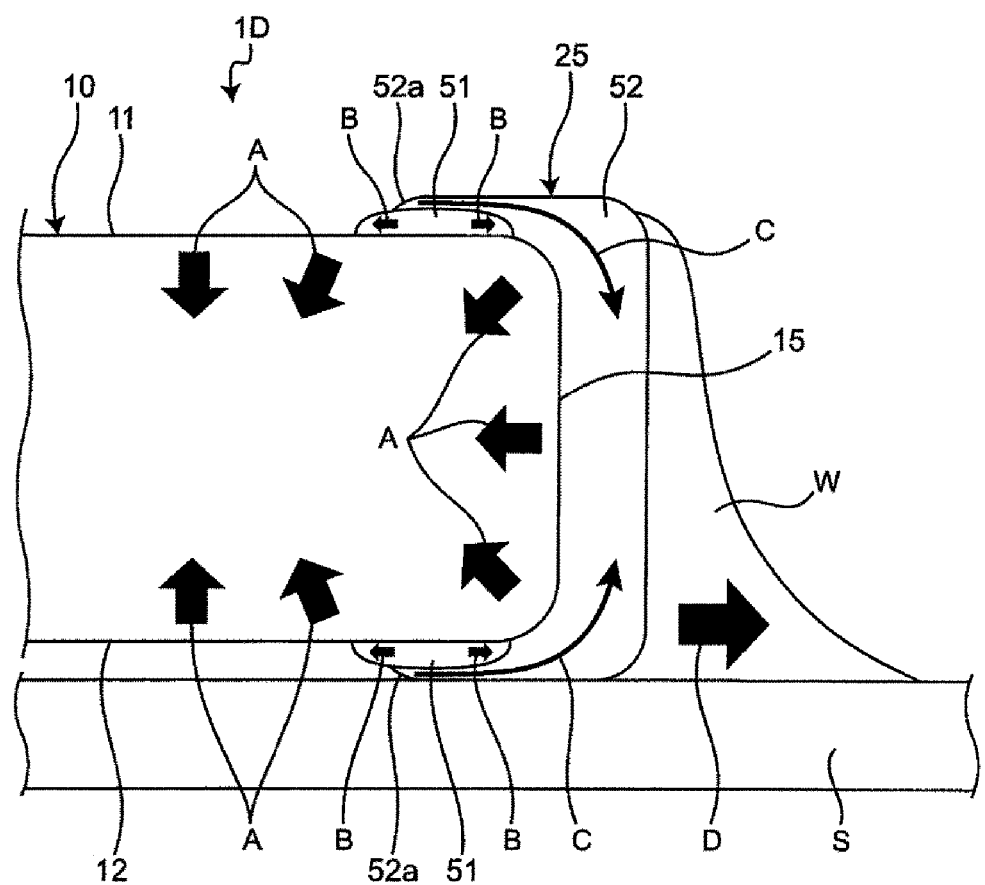
FIG. 13 is a cross-sectional view illustrating a fifth preferred embodiment of an electronic component of the present invention.

FIG. 13 is a cross-sectional view illustrating a fifth preferred embodiment of an electronic component of the present invention. In FIG. 13, hatching is omitted in order for arrows to be easily seen. In the fifth preferred embodiment, characteristics of an upper layer electrode and a lower layer electrode are different from those of the first preferred embodiment. The above-described different configuration will be described below. Since the remaining configuration is the same or substantially the same as that of the first preferred embodiment, the same reference signs as those in the first preferred embodiment are assigned thereto, and description thereof will be omitted.

As illustrated in FIG. 13, in an electronic component 1D of the fifth preferred embodiment, a thermal shrinkage rate of a lower layer electrode 51 is smaller than a thermal shrinkage rate of an upper layer electrode 52. The lower layer electrode 51 includes an oxide, and the upper layer electrode 52 includes an oxide different from that in the lower layer electrode 51. Specifically, the oxide in the lower layer electrode 51 is preferably $Al_2O_3$, for example, and the lower layer electrode 51 preferably includes, for example, copper and $Al_2O_3$. The oxide in the upper layer electrode 52 is preferably $TiO_2$, for example, and the upper layer electrode 52 preferably includes, for example, copper and $TiO_2$. The element body 10 is preferably, for example, glass ceramic, and is made of calcined powder including an oxide of Ba, Al, Si, and Ti.

Accordingly, since the thermal shrinkage rate of the lower layer electrode 51 is smaller than the thermal shrinkage rate of the upper layer electrode 52, the amount of shrinkage of the lower layer electrode 51 due to firing is smaller than that of the upper layer electrode 52. With this, the lower layer electrode 51 between an element body 10 and the upper layer electrode 52 reduces or prevents the difference in shrinkage amounts between the element body 10 and the upper layer electrode 52, so that the presence of the lower layer electrode 51 reduces or prevents the stress of the upper layer electrode 52 being applied to the element body 10.

Specifically, by the firing, an inward stress indicated by an arrow A is generated in the element body 10, an outward stress indicated by an arrow B is generated in the lower layer electrode 51, and an inward stress indicated by an arrow C is generated in the upper layer electrode 52. Accordingly, even if an inward tensile force is exerted on an edge 52a of the upper layer electrode 52 due to the stress of the upper layer electrode 52, since the outward stress is generated in the lower layer electrode 51 between the edge 52a of the upper layer electrode 52 and the element body 10, the tensile force exerted on the edge 52a of the upper layer electrode 52 is reduced or prevented by the stress of the lower layer electrode 51 and is unlikely to be transmitted to the element body 10.

When the electronic component 1D is mounted on a mounting substrate S and then an impact force is applied to the electronic component 1D by dropping it, an outward stress indicated by an arrow D is generated in the solder W. Even if the stress of the solder W is applied to the upper layer electrode 52 and stress is further generated in the upper layer electrode 52, the outward stress of the lower layer electrode 51 reduces or prevents the stress of the upper layer electrode 52 from being applied to the element body 10 so that the damage to the element body 10 due to the dropping is further reduced or prevented.

Further, since the oxide in the lower layer electrode 51 is preferably $Al_2O_3$, for example, the thermal shrinkage rate of the lower layer electrode 51 is able to be lowered by using $Al_2O_3$ among oxides for the lower layer electrode 51.

Furthermore, since the oxide in the upper layer electrode 52 is preferably $TiO_2$, for example, by using $TiO_2$ among oxides for the upper layer electrode 52, a reaction layer having a high affinity is able to be provided at a boundary between the upper layer electrode 52 and the element body 10 and a boundary between the upper layer electrode 52 and the lower layer electrode 51, and the fixing strength between the upper layer electrode 52 and the element body 10 and the fixing strength between the upper layer electrode 52 and the lower layer electrode 51 are improved.

Preferably, the amount of Al in the lower layer electrode 51 is equal to or more than about 5 vol % and equal to or less than about 60 vol %, for example. Thus, the drop strength of the electronic component 1D is able to be further improved, and the firing of the lower layer electrode 51 is able to be improved. In a case in which the amount of Al is excessively large, there is a risk that the firing is difficult to be performed.

Preferably, the amount of Ti in the upper layer electrode 52 is equal to or more than about 5 vol % and equal to or less than about 60 vol %, for example. Thus, the drop strength of the electronic component 1D is able to be further improved, and the firing of the upper layer electrode 52 is able to be improved. In a case in which the amount of Ti is excessively large, there is a risk that the firing is difficult to be performed.

The present invention is not limited to the above preferred embodiments described, and design changes may be made without departing from the spirit and scope of the present invention. For example, features of the first to fifth preferred embodiments may be variously combined.

In the above-described preferred embodiments, although all of the outer electrodes include the lower layer electrode and the upper layer electrode, it is sufficient that at least one of the outer electrodes includes the lower layer electrode and the upper layer electrode.

In the above-described preferred embodiments, in one outer electrode, the lower layer electrode is provided on each of the top and bottom surfaces, and the upper layer electrode is provided on the top surface, the side surface, and the bottom surface. However, it is only necessary that the lower layer electrode is provided on at least one of the top surface and the bottom surface, and the upper layer electrode overlies the lower layer electrode and extends from an upper side of the lower layer electrode onto the side surface.

In the above-described preferred embodiments, the shape of the edge of the lower layer electrode is a straight line, and the shape of the edge of the upper layer electrode is a convex curved line. However, the edge of the lower layer electrode and the edge of the upper layer electrode are not limited to these shapes, and it is sufficient that the radius of curvature of the edge of the lower layer electrode is larger than that of the edge of the upper layer electrode.

In the above-described preferred embodiments, the electronic component is a common mode choke coil including an ESD protection element. In addition to this, the electronic component may be any component including an outer electrode, such as a coil, a capacitor, or a resistor, for example.

Next, a first working example of an electronic component according to a preferred embodiment of the present invention will be described. The present working example includes all of the features of the first to third preferred embodiments of the present invention. Note that the present invention is not limited to this working example.

Hereinafter, a non-limiting example of a manufacturing method of the working example will be described.

A material having a composition mainly including Ba, Al, and Si (a BAS material whose relative dielectric constant εr was adjusted to be 4 to 9) was used as a ceramic material to be used as the material of a ceramic element body. Each material was blended and mixed to have a predetermined composition, and calcined at about 800° C. to about 1000° C., for example. The obtained calcined powder was pulverized with a zirconia ball mill for about 12 hours to obtain ceramic powder. To this ceramic powder, an organic solvent, such as toluene and Ekinen, for example, was added and mixed. Further, a binder and a plasticizer were added and mixed to obtain a slurry. The slurry obtained in this manner was molded on a PET film by the doctor blade method to obtain a ceramic green sheet having a thickness of about 50 µm, for example.

A via hole for connecting the upper and lower portions of the coil layer was provided in the ceramic green sheet (passing through the ceramic portion, not passing through the PET portion) by laser processing.

Paste for a coil was prepared in the following manner: about 80% by weight of Cu powder having an average particle diameter of about 1 μm and about 20% by weight of an organic vehicle prepared by dissolving ethyl cellulose in terpineol were blended and mixed by a three-roller machine.

Paste for a discharge electrode was prepared in the following manner: about 40% by weight of Cu powder having an average particle diameter of about 1 μm, about 40% by weight of Cu powder having an average particle diameter of about 3 μm, and about 20% by weight of an organic vehicle prepared by dissolving ethyl cellulose in terpineol were blended and mixed by the three-roller machine.

A discharge auxiliary electrode was made of a mixture of $Cu/SiC/Al_2O_3$. Cu powder having an average particle diameter of about 0.5 μm, SiC powder having an average particle diameter of about 0.3 μm, and $Al_2O_3$ powder having an average particle diameter of about 0.3 μm were blended to be about 20% by volume, about 40% by volume, and about 40% by volume, respectively. An organic vehicle prepared by dissolving ethyl cellulose in terpineol was set to be about 40% by weight, and the remaining about 60% by weight was taken by Cu, SiC, and $Al_2O_3$; then these materials were stirred and mixed by the three-roller machine to obtain the mixed paste.

Paste for forming a cavity was prepared in the following manner: about 38% by weight of cross-linked acrylic resin beads having an average particle diameter of about 1 μm, and about 62% by weight of an organic vehicle in which about 10% by weight of an Ethocel resin was dissolved in terpineol were blended and mixed by the three-roller machine.

Paste for a sealing layer was prepared in the following manner: about 80% by weight of $Al_2O_3$ powder having an average particle diameter of about 1 μm, and about 20% by weight of an organic vehicle prepared by dissolving ethyl cellulose in terpineol were blended and mixed by the three-roller machine.

Paste for an upper layer electrode was prepared in the following manner: about 80% by weight of Cu powder having an average particle diameter of about 1 μm, about 5% by weight of borosilicate alkaline glass frit, whose transition point is about 620° C. and softening point is about 720° C., having an average particle diameter of about 1 μm, and about 15% by weight of an organic vehicle prepared by dissolving ethyl cellulose in terpineol were blended and mixed by the three-roller machine.

Paste for a lower layer electrode was prepared in the following manner: about 65% by weight of Cu powder having an average particle diameter of about 1 μm, about 10% by weight of $Al_2O_3$ powder having an average particle diameter of about 0.3 μm, about 5% by weight of borosilicate alkaline glass frit, whose transition point is about 620° C. and softening point is about 720° C., having an average particle diameter of about 1 μm, and about 20% by weight of an organic vehicle prepared by dissolving ethyl cellulose in terpineol were blended and mixed by the three-roller machine.

First, the paste for a sealing layer was applied onto a ceramic green sheet. The paste for a discharge auxiliary electrode was applied onto the sealing layer in an arbitrary area. Next, the paste for a discharge electrode was applied, and the paste for forming a cavity was applied so as to cover a space between the discharge electrodes. Finally, the paste for a sealing layer was again applied so as to cover the overall discharge electrode and the overall discharge auxiliary electrode.

By screen printing, the paste for a coil was applied to form a common mode choke coil. In this case, the paste was applied such that the via hole having been formed beforehand was filled with the paste.

By screen printing, the paste for a lower layer electrode was applied in a rectangular or substantially rectangular shape to form a rectangular or substantially rectangular lower layer electrode. In this case, the lower layer electrode was formed so as to extend over two chip regions adjacent to each other. This lower layer electrode was cut in the later cutting process.

The ceramic green sheets were laminated and pressure-bonded. In this case, the ceramic green sheets were laminated so as to have a thickness of about 0.3 mm. The lower layer electrode was disposed on each of the front and rear surfaces. By inverting and integrating a final lamination layer, the lower layer electrode was disposed on each of the front and rear sides.

Individual chips were obtained by cutting with a micro cutter. In this case, the cutting process was performed such that the size of the final product was about 1.25 mm×about 1.0 mm. Thus, the state as illustrated in FIG. 9C was obtained.

The chip was barrel-polished. With this, corner portions (four corners and ridge lines) of the chip were rounded.

By dip coating, the paste for an upper layer electrode was applied to a side surface of the element body to form an upper layer electrode. In this case, as illustrated in FIG. 4, the upper layer electrode was formed so as not to exceed the depth of the lower layer electrode (Ay>By). Further, by forming the upper layer electrode such that the width of the lower layer electrode does not exceed the width of the upper layer electrode (Ax<Bx), preferable connectivity was obtained.

Subsequently, firing was performed in the atmosphere of $N_2$. In the case of an electrode material which does not oxidize, the firing may be performed in the air atmosphere.

The chip having experienced firing on which the upper layer electrode and lower layer electrode were formed and a medium made of zirconia having an average particle diameter of about 0.5 mm were mixed, and vibrations were applied thereto, such that the medium collided against the upper layer electrode and the lower layer electrode.

Electrolytic Ni—Sn plating was performed on the outer electrodes including the upper layer electrode and the lower layer electrode.

As described above, the common mode choke coil including the ESD protection element was completed. Note that the ceramic material used for the substrate is not particularly limited to the above-described materials, and may be, for example, an LTCC material obtained by adding glass or other suitable material to $Al_2O_3$, cordierite, mullite, forsterite or $CaZrO_3$, an HTCC material such as $Al_2O_3$, cordierite, mullite or forsterite, a ferrite material, a dielectric material, or a resin material. Further, the electrode material may be, in addition to Cu, for example, Ag, Pd, Pt, Al, Ni, W or a combination thereof. However, Cu or Ag having high thermal conductivity is preferable.

Hereinafter, experimental results of the working example will be described. As a comparative example, an outer electrode was configured not to include the lower layer electrode of the working example, but to include only an upper layer electrode.

In the comparative example, the outer electrode (including only the upper layer electrode) was formed by a dip coating method. Because of this, in the outer electrode of the comparative example, bleeding was large and poor appearance caused by dimensional abnormality was likely to occur. In contrast, in the working example, the outer electrode was formed by the combination of a printing method (lower layer electrode) and a dip coating method (upper layer electrode). Accordingly, in the outer electrode of the working example, bleeding was small and a poor appearance rate was reduced by the printing scheme.

100 samples of the working example and 100 samples of the comparative example were prepared, and then a solder heat resistance test was performed. The solder heat resistance test was performed as follows: the working example sample and the comparative example sample were mounted on a printed circuit substrate; a thermal load was repeated applied 10 times under the following reflow conditions; and thereafter, the mounting substrate was impregnated with a checker solution and the samples were observed while being magnified 10 times under a stereomicroscope. Then, in the case in which a crack having a length of equal to or longer than about 100 μm was observed in any one of the 100 samples, this group of samples was determined to be no good. In contrast, in the case in which a crack having a length of equal to or longer than about 100 μm was not observed at all in any of the 100 samples, this group of samples was determined to be good.

The reflow conditions were as follows.

i) Preheating temperature: about 150° C. to about 200° C., about 90±30 seconds ii) Main heating: about 217° C., about 60 to about 150 seconds or more iii) Peak temperature: about 260° C. or higher (top keeping: about 255° C. or higher, about 30 seconds or more)

iv) Temperature rise speed: about 3° C./second or higher v) Atmosphere: air

As a result of the solder heat resistance test, the working example was determined to be good, while the comparative example was determined to be no good. Accordingly, it was confirmed in the working example that, by providing the lower layer electrode, the concentration of the stress directly applied from the solder was able to be reduced or prevented even if the shrinkage force of the solder was directly applied to the lower layer electrode.

100 samples of the working example and 100 samples of the comparative example were prepared, and then a drop test was performed. The drop test was performed as follows: under the above-described reflow conditions, a mounting substrate on which the working example sample and the comparative example sample were mounted on a printed circuit substrate by soldering was dropped 10 times from a position of a height of about 180 cm; and thereafter, it was checked whether or not a crack was formed. In this case, the mounting substrate was impregnated with a checker solution and the samples were observed while being magnified 10 times under a stereomicroscope. Then, in the case in which a crack having a length of equal to or longer than about 100 μm was observed in any one of the 100 samples, this group of samples was determined to be no good. In contrast, in the case in which a crack having a length of equal to or longer than about 100 μm was not observed at all in any of the 100 samples, this group of samples was determined to be good.

As a result of the drop test, the working example was determined to be good, while the comparative example was determined to be no good. Accordingly, it was confirmed in the working example that, by providing the lower layer electrode, the concentration of the stress indirectly applied from the solder was able to be reduced or prevented even if the drop impact was applied to the lower layer electrode via the solder.

Next, a second working example of an electronic component will be described. The present working example includes the features of the fifth preferred embodiment. Note that the present invention is not limited to the present working example.

A non-limiting example of a manufacturing method of the second working example differs from the manufacturing method of the first working example in that a composition of an outer electrode (lower and upper layer electrodes) is different, and remaining elements are the same or substantially the same as those of the first working example. In the second working example, as an outer electrode paste, pastes of P-1 to P-6 illustrated in Table 1 were used.

TABLE 1

| Outer Electrode Paste Composition (vol %) | | | | | | | |
|---|---|---|---|---|---|---|---|
| | P-1 | P-2 | P-3 | P-4 | P-5 | P-6 | P-7 |
| Copper powder | 11.0 | 11.0 | 11.0 | 11.0 | 11.0 | 11.0 | 11.0 |
| $Al_2O_3$ | — | — | — | — | 0.6 | 6.0 | 7.0 |
| $TiO_2$ | — | 0.6 | 6.0 | 7.0 | — | — | — |
| Varnish | 89.0 | 88.4 | 83.0 | 82.0 | 88.4 | 83.0 | 82.0 |
| Total | 100.0 | 100.0 | 100.0 | 100.0 | 100.0 | 100.0 | 100.0 |

Table 2, Table 3, and Table 4 describe characteristics of materials used in the preparation of the pastes. Table 2 describes characteristics of copper powder, Table 3 describes characteristics of alumina powder, and Table 4 describes characteristics of titanium oxide.

TABLE 2

| Copper Powder Characteristics | |
|---|---|
| Product name | 1100Y-2 |
| Manufacturer | Mitsui Mining & Smelting Co., Ltd. |
| Lot | H150601PN |
| Center particle diameter (μm) | 1.1 |
| Specific surface area ($m^2$/g) | 0.64 |
| Tap density (g/ml) | 4.6 |

TABLE 3

| Alumina Powder Characteristics | |
|---|---|
| Product name | AKP-50 |
| Manufacturer | Sumitomo Chemical Industry Co., Ltd. |
| Lot | HD5611 |
| Purity (%) | 99.99 |
| Specific surface area ($m^2$/g) | 10.5 |
| Bulk density tamped (g/$cm^3$) | 1.0 |
| Bulk density loosed (g/$cm^3$) | 1.2 |
| Water content (%) | 0.2 |
| Si (ppm) | 8 |
| Na (ppm) | 2 |
| Mg (ppm) | 2 |
| Cu (ppm) | 1 |
| Fe (ppm) | 3 |

TABLE 4

| Titanium Oxide Characteristics | |
|---|---|
| Product name | F-10 |
| Manufacturer | Showa Denko Ceramics |
| Lot | J12002 |
| Rutile ratio (wt %) | 92 |
| Specific surface area ($m^2$/g) | 11 |
| Cl (wt %) | 0.04 |
| Fe (wt %) | <0.001 |

TABLE 4-continued

| Titanium Oxide Characteristics | |
| --- | --- |
| Al (wt %) | <0.01 |
| Si (wt %) | <0.02 |
| Tap density (g/cm$^3$) | 0.43 |
| D50 (μm) | 0.53 |
| D90 (μm) | 0.85 |

As described in Table 5, a plurality of working example products K-1 to K-30 were prepared by variously combining the pastes P-1 to P-7 in Table 1 as the lower layer electrodes and the upper layer electrodes, and then a shape check, a solderability check, and a drop test were performed on these products.

Figure 14A:
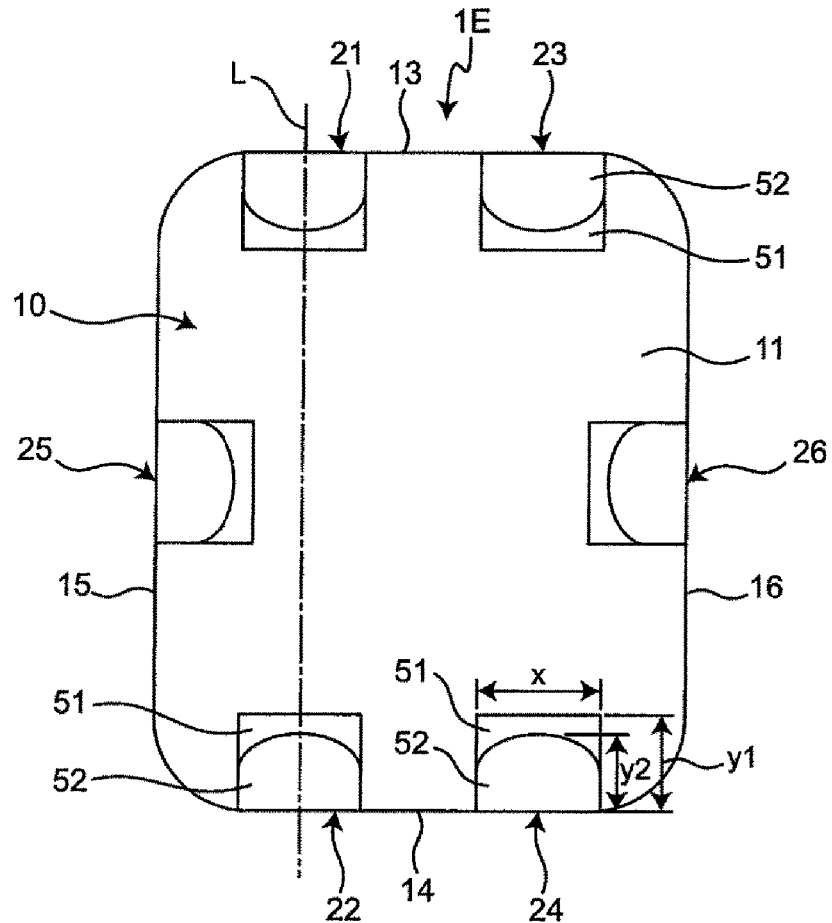
FIG. 14A is a plan view illustrating a second working example of an electronic component according to a preferred embodiment of the present invention.
Figure 14B:
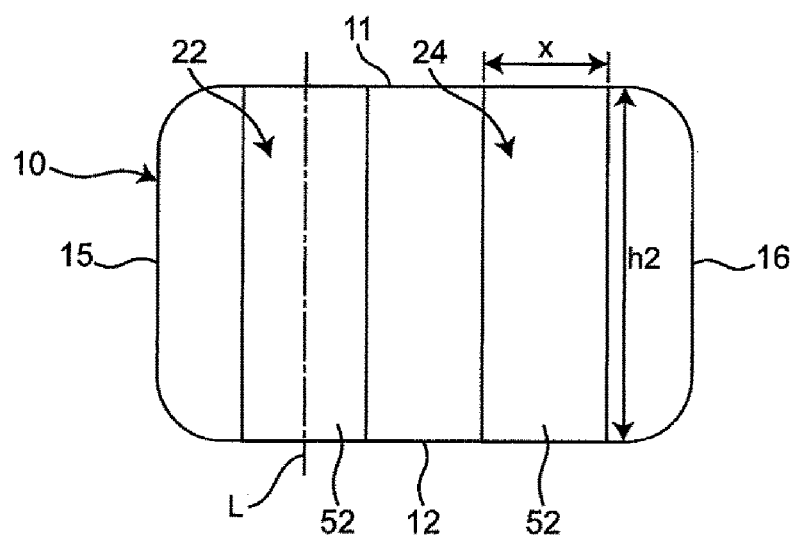
FIG. 14B is a side view illustrating the second working example of an electronic component according to a preferred embodiment of the present invention.

The shape check, the solderability check, and the drop test will be described below. As illustrated in FIGS. 14A and 14B, an electronic component 1E was manufactured. In comparison with the first preferred embodiment, characteristics of a lower layer electrode 51 and an upper layer electrode 52 of the electronic component 1E are different from those of the first preferred embodiment. Since the remaining configuration of the electronic component 1E are the same or substantially the same as those in the first preferred embodiment, the same reference signs as those in the first preferred embodiment are assigned thereto, and description thereof will be omitted.

The pastes P-1 to P-7 were used for the lower layer electrode 51 and the upper layer electrode 52. On a top surface 11 and a bottom surface 12 of an element body 10, for example, a width x of the lower layer electrode 51 and the upper layer electrode 52 was set to be about 250 μm, a length y1 of the lower layer electrode 51 was set to be about 200 μm, and a length y2 of the upper layer electrode 52 was set to be about 100 μm. A height h2 of the upper layer electrode 52 was set to be about 750 μm at the first to fourth side surfaces 13 to 16 of the element body 10.

Further, the electronic component 1E was polished until a cross section thereof at a position of a cut line L appeared, and then the cross section was magnified about 350 to about 3000 times by WDX so as to check the abundance (vol %) of Ti and Al in the lower layer electrode 51 and the upper layer electrode 52. In Table 5, the above-described abundance is indicated as "lower layer electrode Al amount", "lower layer electrode Ti amount", "upper layer electrode Al amount", and "upper layer electrode Ti amount".

Figure 15:
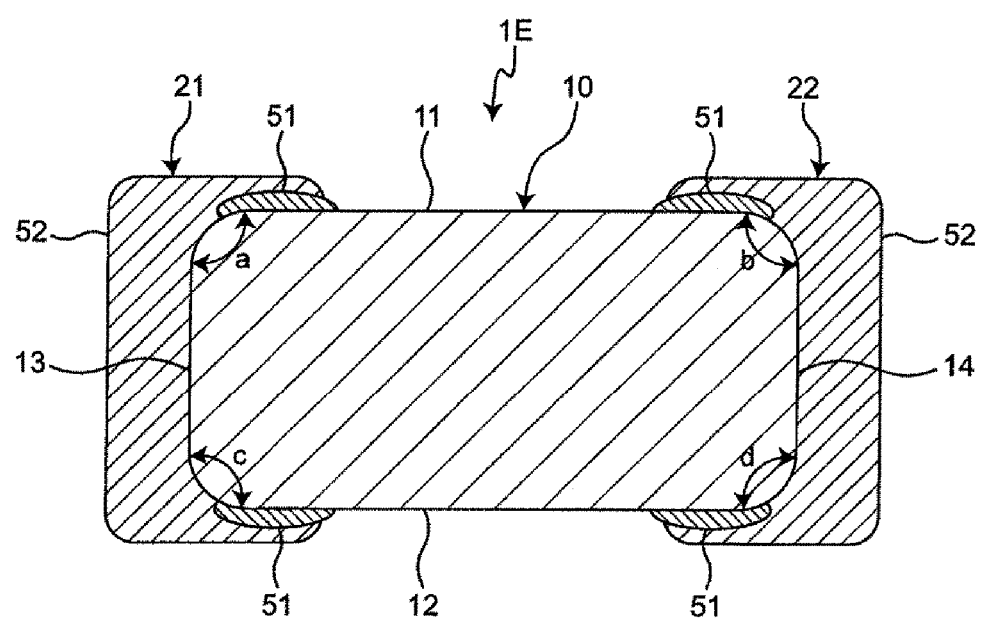
FIG. 15 is a cross-sectional view illustrating the second working example of an electronic component according to a preferred embodiment of the present invention.

Further, as illustrated in FIG. 15, angles a, b, c, and d of the four corners of the element body 10 having experienced the cross-section polishing were measured. Then, the work-

TABLE 5

| Working example product | Lower layer electrode paste | Upper layer electrode paste | Lower layer electrode Al amount (vol %) | Lower layer electrode Ti amount (vol %) | Upper layer electrode Al amount (vol %) | Upper layer electrode Ti amount (vol %) | Shape check result | Solderability check result | Drop test result | Overall determination |
| --- | --- | --- | --- | --- | --- | --- | --- | --- | --- | --- |
| K-1* | P-1 | P-1 | 0.0 | 0.0 | 0.0 | 0.0 | Good | Good | NG | NG |
| K-2* | P-1 | P-2 | 0.0 | 0.0 | 0.0 | 5.0 | Good | Good | NG | NG |
| K-3* | P-1 | P-3 | 0.0 | 0.0 | 0.0 | 60.0 | Good | Good | NG | NG |
| K-4* | P-1 | P-5 | 0.0 | 0.0 | 5.0 | 0.0 | Good | Good | NG | NG |
| K-5* | P-1 | P-6 | 0.0 | 0.0 | 60.0 | 0.0 | Good | Good | NG | NG |
| K-6* | P-2 | P-1 | 0.0 | 5.0 | 0.0 | 0.0 | Good | Good | NG | NG |
| K-7* | P-3 | P-1 | 0.0 | 60.0 | 0.0 | 0.0 | Good | Good | NG | NG |
| K-8* | P-2 | P-2 | 0.0 | 5.0 | 0.0 | 5.0 | Good | Good | NG | NG |
| K-9* | P-2 | P-3 | 0.0 | 5.0 | 0.0 | 60.0 | Good | Good | NG | NG |
| K-10* | P-3 | P-2 | 0.0 | 60.0 | 0.0 | 5.0 | Good | Good | NG | NG |
| K-11* | P-3 | P-3 | 0.0 | 60.0 | 0.0 | 60.0 | Good | Good | NG | NG |
| K-12* | P-2 | P-5 | 0.0 | 5.0 | 5.0 | 0.0 | NG | Good | NG | NG |
| K-13* | P-2 | P-6 | 0.0 | 5.0 | 60.0 | 0.0 | NG | Good | NG | NG |
| K-14* | P-3 | P-5 | 0.0 | 60.0 | 5.0 | 0.0 | NG | Good | NG | NG |
| K-15* | P-3 | P-6 | 0.0 | 60.0 | 60.0 | 0.0 | NG | Good | NG | NG |
| K-16 | P-5 | P-1 | 5.0 | 0.0 | 0.0 | 0.0 | Good | Good | Good | Good |
| K-17 | P-6 | P-1 | 60.0 | 0.0 | 0.0 | 0.0 | Good | Good | Good | Good |
| K-18* | P-7 | P-1 | 70.0 | 0.0 | 0.0 | 0.0 | Good | NG | — | NG |
| K-19* | P-5 | P-5 | 5.0 | 0.0 | 5.0 | 0.0 | NG | Good | Excellent | NG |
| K-20* | P-5 | P-6 | 5.0 | 0.0 | 60.0 | 0.0 | NG | Good | Excellent | NG |
| K-21* | P-6 | P-5 | 60.0 | 0.0 | 5.0 | 0.0 | NG | Good | Excellent | NG |
| K-22* | P-6 | P-6 | 60.0 | 0.0 | 60.0 | 0.0 | NG | Good | Excellent | NG |
| K-23 | P-5 | P-2 | 5.0 | 0.0 | 0.0 | 5.0 | Good | Good | Excellent | Excellent |
| K-24 | P-5 | P-3 | 5.0 | 0.0 | 0.0 | 60.0 | Good | Good | Excellent | Excellent |
| K-25 | P-6 | P-2 | 60.0 | 0.0 | 0.0 | 5.0 | Good | Good | Excellent | Excellent |
| K-26 | P-6 | P-3 | 60.0 | 0.0 | 0.0 | 60.0 | Good | Good | Excellent | Excellent |
| K-27* | P-7 | P-2 | 70.0 | 0.0 | 0.0 | 5.0 | Good | NG | — | NG |
| K-28* | P-7 | P-3 | 70.0 | 0.0 | 0.0 | 60.0 | Good | NG | — | NG |
| K-29* | P-5 | P-4 | 5.0 | 0.0 | 0.0 | 70.0 | Good | NG | — | NG |
| K-30* | P-6 | P-4 | 60.0 | 0.0 | 0.0 | 70.0 | Good | NG | — | NG | ing example product in which any one of the above four angles was smaller than about 75 degrees was determined to be "NG", and the working example product in which all of the four angles were about 75 degrees to about 120 degrees was determined to be "Good". This is indicated as the shape check result in Table 5.

Furthermore, a solder wettability test (JIS C 60068-2-58) was performed on the electronic component 1E. The electronic component 1E was preheated by heating to about 100° C. to about 120° C. for about 60 seconds, and immersed for about 2±0.5 seconds in a solder bath of Sn-3.0Ag-0.5Cu at about 230±5° C. until the lower layer electrode 51 and the upper layer electrode 52 were hidden in the solder bath. An immersing speed and a pulling-up speed were about 20 mm/sec to about 25 mm/sec. The lower layer electrode 51 and the upper layer electrode 52 of the electronic component 1E having been pulled up were magnified and observed under a metallographic microscope, so as to check the wettability of the solder. The working sample product in which the rate of the solder adhesion portion was less than about 80% in any one of the lower layer electrode 51 and the upper layer electrode 52 was determined to be "NG". In contrast, the working example product in which the rate of the solder adhesion portion is equal to or more than about 80% in each of the lower layer electrode 51 and the upper layer electrode 52 was determined to be "Good". This is indicated as the solderability check result in Table 5.

Further, Ni/Sn electrolytic plating was performed on the outer electrode, and then a drop test was performed. In other words, solder was applied to a printed circuit substrate and the electronic component 1E was placed thereon, and then the solder mounting was performed by reflow at about 260° C. Thereafter, the printed circuit substrate was dropped 10 times from a height of about 180 cm. After this, the printed circuit substrate was impregnated with a red checker solution and the working example product was visually checked while being magnified 10 times under a stereomicroscope. Then, in the case in which a crack having a length of equal to or longer than about 100 µm was observed, the working example product was determined to be "NG", and in the case in which no crack was observed, the working example product was determined to be "Good". After the dropping having been performed times from a height of about 200 cm, the printed circuit substrate was impregnated with the red checker liquid and the working example product was visually checked while being magnified 10 times under the stereomicroscope. Then, in the case in which a crack having a length of equal to or longer than about 100 µm was not observed, the working example product was determined to be "Excellent". This is indicated as the drop test result in Table 5. Note that the drop test was not performed on the working example product whose solderability had been determined to be "NG".

As described in Table 5, for the working example product in which all of the shape check result, the solderability check result, and the drop test result were determined to be "Good", the overall determination was made to be "Good". For the working example product in which the shape check result and the solderability check result were determined to be "Good" and the drop test result was determined to be "Excellent", the overall determination was made to be "Excellent". For the working example products other than those cited above, the overall determinations were made to be "NG". The mark "*" is attached to the working example product whose overall determination is "NG".

The working example products K-16 and K-17 whose overall determinations are "Good" each include the composition of the lower layer electrode and the upper layer electrode in the first working example. In other words, in the first working example, the lower layer electrode includes $Al_2O_3$, and the upper layer electrode does not include $Al_2O_3$ or $TiO_2$, for example.

Each of the working example products K-23 to K-26 whose overall determinations are "Excellent" is the most preferable configuration of the fifth preferred embodiment, in other words, preferably, the amount of Al in the lower layer electrode 51 is equal to or more than about 5 vol % and equal to or less than about 60 vol %, and the amount of Ti in the upper layer electrode 52 is equal to or more than about 5 vol % and equal to or less than about 60 vol %, for example.

Here, in view of only the drop test results, the working example products K-19 to K-22 are also acceptable and may be determined to be "Excellent". However, the shape check results of the working example products K-19 to K-22 are not good, and therefore determined to be "NG". This is because, by using the paste in which $Al_2O_3$ is added for both of the lower layer electrode 51 and the upper layer electrode 52, shrinkage of the element body 10, which is glass ceramic, is reduced or prevented so that the shape is deteriorated.

By using the paste in which $Al_2O_3$ is added for the lower layer electrode 51 and using the paste in which $TiO_2$ is added for the upper layer electrode 52, as in the case of the working example products K-23 to K-26 whose overall determinations are "Excellent", a stronger drop strength is able to be obtained while ensuring a preferable shape. In other words, the lower layer electrode 51 reduces or prevents the stress, thus making it possible to reduce or prevent a crack in the drop test.

Further, by causing the additive amount of oxide (Al amount, Ti amount) to be equal to or less than about 60 vol % in the lower layer electrode 51 and the upper layer electrode 52, preferable solderability is able to be ensured.

All of the working example products in Table 5 have a configuration including the features of the first preferred embodiment, that is, have a configuration in which "the edge of the lower layer electrode is disposed at a position farther from the side surface than a position of the edge of the upper layer electrode, and the radius of curvature of the edge of the lower layer electrode is larger than the radius of curvature of the edge of the upper layer electrode." Therefore, it is possible to reduce or prevent a crack of the electronic component generating from the vicinity of the edge of the lower layer electrode due to the stress of the solder when the outer electrode is bonded to the mounting substrate by solder.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
an element body and a plurality of outer electrodes provided on the element body; wherein
the element body includes a top surface, a bottom surface opposing the top surface, and a plurality of side surfaces connecting the top surface and the bottom surface;
at least one of the plurality of outer electrodes includes a lower layer electrode provided on at least one of the top surface and the bottom surface, and an upper layer electrode that overlies the lower layer electrode and extends from an upper side of the lower layer electrode onto the side surface;
when viewed from a direction orthogonal or substantially orthogonal to the top surface and the bottom surface, an edge of the lower layer electrode is disposed at a position farther from a side surface of the plurality of side surfaces at which the upper layer electrode is provided than a position of an edge of the upper layer electrode, and a radius of curvature of the edge of the lower layer electrode is larger than a radius of curvature of the edge of the upper layer electrode; and
a thermal shrinkage rate of the lower layer electrode is smaller than a thermal shrinkage rate of the upper layer electrode.

2. The electronic component according to claim 1, wherein a width of the upper layer electrode is larger than a width of the lower layer electrode.

3. The electronic component according to claim 1, wherein a shape of the edge of the lower layer electrode is a straight line.

4. An electronic component, comprising:
- an element body and a plurality of outer electrodes provided on the element body; wherein
- the element body includes a top surface, a bottom surface opposing the top surface, and a plurality of side surfaces connecting the top surface and the bottom surface;
- at least one of the plurality of outer electrodes includes a lower layer electrode provided on at least one of the top surface and the bottom surface, and an upper layer electrode that overlies the lower layer electrode and extends from an upper side of the lower layer electrode onto the side surface;
- when viewed from a direction orthogonal or substantially orthogonal to the top surface and the bottom surface, an edge of the lower layer electrode is disposed at a position farther from a side surface of the plurality of side surfaces at which the upper layer electrode is provided than a position of an edge of the upper layer electrode, and a radius of curvature of the edge of the lower layer electrode is larger than a radius of curvature of the edge of the upper layer electrode; and
- in a cross section at a center or approximate center in a width direction of the lower layer electrode, a thickness of the lower layer electrode is increased toward the side surface.

5. The electronic component according to claim 1, wherein the upper layer electrode and the lower layer electrode each include a contact surface having a convexo-concave shape, and the contact surfaces are in close contact with each other.

6. The electronic component according to claim 1, wherein the plurality of outer electrodes are provided on a single side surface of the plurality of side surfaces.

7. The electronic component according to claim 1, wherein a width of a portion of the upper layer electrode overlying the side surface increases toward the top surface and toward the bottom surface from a center or approximate center in a height direction of the overlying portion.

8. An electronic component, comprising:
- an element body and a plurality of outer electrodes provided on the element body; wherein
- the element body includes a top surface, a bottom surface opposing the top surface, and a plurality of side surfaces connecting the top surface and the bottom surface;
- at least one of the plurality of outer electrodes includes a lower layer electrode provided on at least one of the top surface and the bottom surface, and an upper layer electrode that overlies the lower layer electrode and extends from an upper side of the lower layer electrode onto the side surface;
- when viewed from a direction orthogonal or substantially orthogonal to the top surface and the bottom surface, an edge of the lower layer electrode is disposed at a position farther from a side surface of the plurality of side surfaces at which the upper layer electrode is provided than a position of an edge of the upper layer electrode, and a radius of curvature of the edge of the lower layer electrode is larger than a radius of curvature of the edge of the upper layer electrode; and
- a shape of the edge of the lower layer electrode on a side of the side surface at which the upper layer electrode is provided is a convex curved line.

9. The electronic component according to claim 1, wherein the lower layer electrode includes an oxide, and the upper layer electrode includes an oxide different from the oxide in the lower layer electrode.

10. The electronic component according to claim 9, wherein the oxide of the lower layer electrode is $Al_2O_3$.

11. The electronic component according to claim 9, wherein the oxide of the upper layer electrode is $TiO_2$.

12. The electronic component according to claim 10, wherein an amount of Al in the lower layer electrode is equal to or more than about 5 vol % and equal to or less than about 60 vol %.

13. The electronic component according to claim 11, wherein an amount of Ti in the upper layer electrode is equal to or more than about 5 vol % and equal to or less than about 60 vol %.

14. The electronic component according to claim 4, wherein a width of the upper layer electrode is larger than a width of the lower layer electrode.

15. The electronic component according to claim 4, wherein a shape of the edge of the lower layer electrode is a straight line.

16. The electronic component according to claim 8, wherein a width of the upper layer electrode is larger than a width of the lower layer electrode.

17. The electronic component according to claim 8, wherein a shape of the edge of the lower layer electrode is a straight line.

18. The electronic component according to claim 4, wherein a width of a portion of the upper layer electrode overlying the side surface increases toward the top surface and toward the bottom surface from a center or approximate center in a height direction of the overlying portion.

19. The electronic component according to claim 8, wherein a width of a portion of the upper layer electrode overlying the side surface increases toward the top surface and toward the bottom surface from a center or approximate center in a height direction of the overlying portion.

* * * * *